No. 766,540.

Patented August 2, 1904.

UNITED STATES PATENT OFFICE.

OTTO SOHST, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

ORANGE DYE AND PROCESS OF MAKING SAME.

SPECIFICATION forming part of Letters Patent No. 766,540, dated August 2, 1904.

Application filed November 27, 1903. Serial No. 182,889. (No specimens.)

*To all whom it may concern:*

Be it known that I, OTTO SOHST, Ph. D., a citizen of the Empire of Germany, residing at Höchst-on-the-Main, Germany, have invented certain new and useful Improvements in Orange Dyestuffs and Process of Making Same, of which the following is a specification.

I have found that the yellow to orange-yellow dyestuffs or their leuco compounds described in German Patents Nos. 133,788 and 136,729 and obtained by the interaction of monochloro-acetic acid or its alkylesters and acrioline-yellow or its leuco compound or by directly heating the base of tetramidoditolylmethane with mineral acid and monochloro-acetic acid or its alkylesters and which I will call hereinafter "glycinacridins" may be transformed by further treatment with mineral acids and alcohols into more valuable orange to orange-red dyeing products. The constitution of this class of dyestuffs cannot as yet be defined. When dry, they are brown-red powders, yielding on leather or cotton mordanted with tannin orange to orange-red shades. They are readily soluble in water with an orange color, but soluble with difficulty in alcohol and insoluble in ether, benzene, or ligroin. In concentrated sulfuric acid they dissolve a yellow solution of green fluorescence. The further alkylation occurs best according to United States Patent No. 739,117 by the action of alcohol on the dilute solution of the hydrochlorid of the leuco compounds.

Example I.—One hundred grams of meta-toluylenediamin are dissolved in about two hundred grams of water and one hundred grams of concentrated hydrochloric acid, into which are stirred thirty grams of formaldehyde of forty-per-cent. strength and after some hours one hundred grams of hydrochloric acid. The whole is then heated in a closed vessel to 140° to 150° centigrade for from three to four hours. The mixture is then allowed to cool to 90° to 100° centigrade, whereupon about forty grams of monochloro-acetic acid are added. The whole is again heated to about 140° centigrade for from one to two hours. The solution of the leuco-glycinacridin yellow thus obtained may be directly further alkylated by treating it after being cooled to 60° centigrade with about fifty grams of methyl alcohol and heating it in a closed vessel to 170° to 175° centigrade for one and one-half hours. The solution of the leuco compound of alkylglycinacridin yellow thus obtained is first oxidized by the air and then completely with about fifty grams of ferric chlorid. The dyestuff is precipitated from this solution by adding zinc chlorid and common salt. When dry, it is a brown-red powder dyeing leather and cotton mordanted with tannin an orange shade. If in this example for methyl alcohol be substituted an equivalent quantity of ethyl alcohol, a somewhat more yellowish dyeing dyestuff is obtained of otherwise the same properties. Essentially redder dyeing products are obtained, however, if in further alkylating the glycinacridins for hydrochloric acid and alcohol concentrated sulfuric acid and alcohol be used.

Having now described my invention, what I claim is—

1. The herein-described process of making orange to orange-red dyeing dyestuffs, which consists in treating glycinacridins of the class described with mineral acids and alcohols, substantially as set forth.

2. As new products the orange to orange-red dyeing dyestuffs obtained by treating glycinacridins of the class described with mineral acids and alcohols, being, when dry, brown-red powders, readily soluble in water with an orange to orange-red color, soluble with difficulty in alcohol, insoluble in ether, benzene and ligroin and soluble in concentrated sulfuric acid with a yellow color and green fluorescence, dyeing leather and tannin-mordanted cotton orange to orange-red shades.

3. As a new article of manufacture, the orange dyestuff, obtained by treating leuco-glycinacridin of the class described with mineral acid and alcohol, and subsequent oxidation, being, when dry, a brown-red powder, readily soluble in water with an orange color, soluble with difficulty in alcohol, insoluble in ether, benzene and ligroin and soluble in concentrated sulfuric acid with a yellow color and green fluorescence, dyeing leather and tannin-mordanted cotton orange to orange-red shades.

In testimony that I claim the foregoing as my invention I have signed my name in presence of two subscribing witnesses.

OTTO SOHST.

Witnesses:
ALFRED FRISBOIS,
JOSEPH FLACH.